May 4, 1948.   P. L. SPENCER   2,440,704
PRESSURE MEASURING DEVICE
Filed Feb. 26, 1944
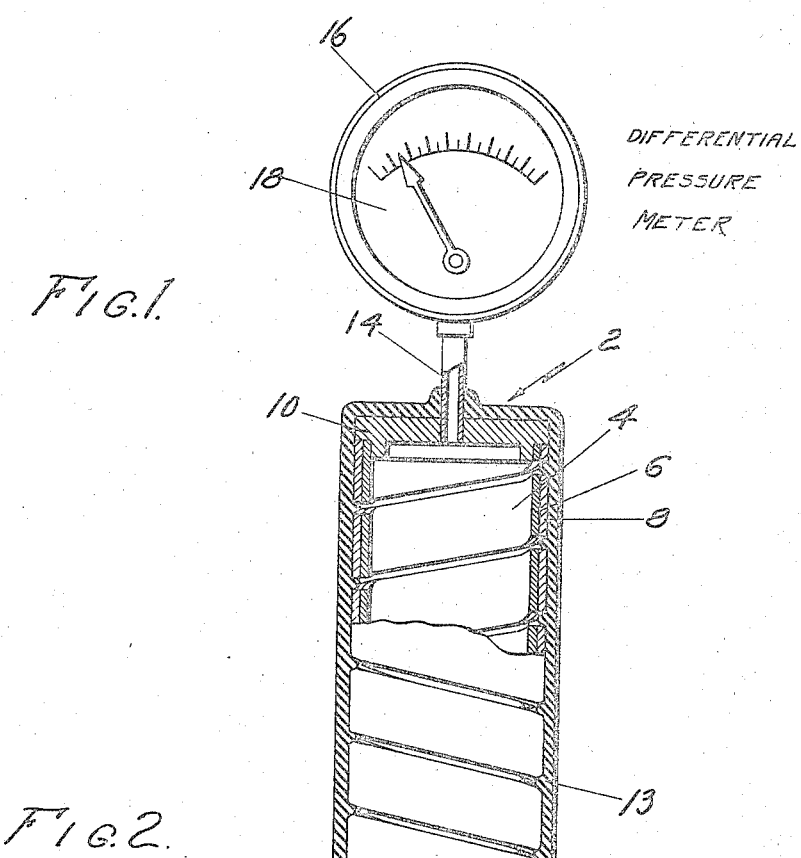
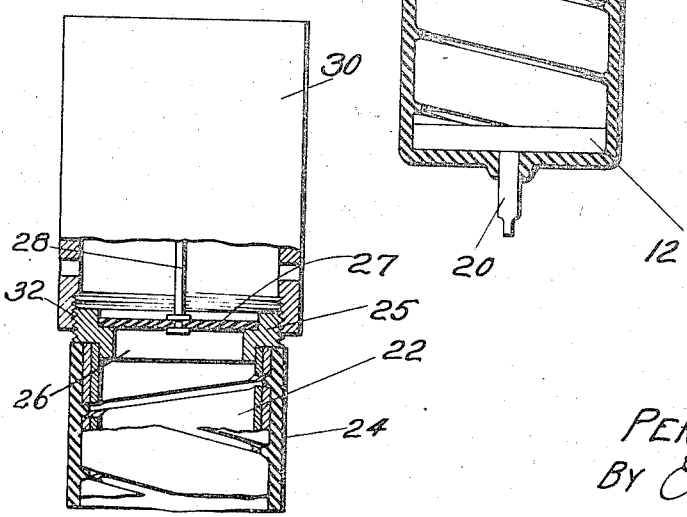
INVENTOR.
PERCY L. SPENCER,
BY Elmer J. Gorn
ATTY.

Patented May 4, 1948

2,440,704

UNITED STATES PATENT OFFICE 2,440,704

PRESSURE MEASURING DEVICE

Percy L. Spencer, West Newton, Mass., assignor to Raytheon Manufacturing Company, Newton, Mass., a corporation of Delaware Application February 26, 1944, Serial No. 524,125

7 Claims. (Cl. 73—386)

The present invention relates to an apparatus responsive to gaseous or atmospheric pressure.

One of the objects of the invention is to provide such a pressure responsive apparatus which will not be affected by variations in temperature.

Another object of the invention is to provide such a pressure responsive device that is simple in construction, rugged, convenient and reliable in operation.

These, and such other aims and objects of the invention as may hereinafter appear, will be readily understood from the following description, taken in connection with the accompanying drawing of embodiments of the invention herein presented for illustrative purposes.

In the drawing:

Fig. 1 is a front elevation of one illustrative embodiment of the invention showing the outer covering in section and having a part of the outer wall of the remaining structure broken away to show the structure in longitudinal cross-section; and Fig. 2 shows the upper portion, partly in longitudinal cross-section, of another illustrative embodiment of the invention.

Referring to Fig. 1, the illustrative embodiment of the invention therein represented comprises a casing designated generally by the reference numeral 2, said casing herein being of cylindrical shape for convenience. The lateral wall of said casing 2 comprises means adapted to respond to variations in temperature herein conveniently comprising a thermally responsive metal band or ribbon in the form of a helix 4, preferably composed of two metals 6 and 8 of widely differing thermal coefficients of expansion. One end-convolution of said helix is mounted in a cap 10 and the other end-convolution is mounted in a cap 12. A pipe 14 communicates with the interior of said casing 2 through said cap 10 and with the pressure-responsive element of a conventional differential pressure gauge 18 mounted in a housing 16. Thus the gauge 18 measures the difference in pressure between the outside atmosphere and the gas in the pipe 14. Said helix and said two caps are completely encased in a layer 13 of resilient material, such as rubber latex for example. For this purpose, if rubber latex is used, the helix and the two caps 10 and 12 are first assembled and the resultant structure is then completely immersed in liquid latex which is then cooked until converted into rubber latex. The structure is then withdrawn, and will be formed to be completely encased in a layer of rubber latex firmly adhering thereto, which will also have penetrated into the space between the convolutions of the helix, thus rendering the entire container airtight. The casing is now filled with air or other suitable gaseous medium through a pipe 20 sealed through said cap 12, said pipe being then sealed.

From the above description it will be apparent that the metal helix will contract or expand in response to variations in temperature, substantially unhindered by the rubber latex, which is resilient, thus decreasing or increasing the interior volume of the device and allowing the volume of the gaseous medium contained in the device to decrease or increase in response to variations in temperature. This is important, because if the volume of the gaseous medium within the casing could not vary in response to temperature variations, the pressure of said medium within the casing would vary in response to temperature variations and the reading of the pressure gauge 18 would be incorrect. The variation in the volume of the container and of the gaseous medium contained therein must be proportional to the variation in the absolute temperature of the ambient atmosphere or other ambient gaseous medium. As it is, the meter 18 in the present device will not respond to temperature variations but will indicate only differential pressure variations that are due to variations in pressure of the ambient air or other surrounding gaseous medium.

The illustrative embodiment of the invention shown in Fig. 2 comprises a casing including a bimetallic helix 22 having its bottom convolution mounted in a cap having sealed therein a tube for filling said casing with a gaseous medium, said helix and cap being encased in a layer 24 of latex, to render the parts covered thereby airtight. The lower portion of the device, comprising said cap and said tube, is not shown as these parts may and preferably will be the same as the corresponding parts of the embodiment of the invention shown in Fig. 1.

The top convolution of said helix 22 is mounted in a cap 25 provided with a circular aperture 26 closed by a diaphragm 27 of any suitable material, rubber for example. A rod 28 is secured at one end to the center of said diaphragm and extends upwardly into a housing 30 to connect at its other end with the pressure-responsive element of a conventional relative pressure gauge. Said housing is removably connected to said casing by screw threaded connection 32 with the peripheral surface of said cap 25.

The device embodying the present invention is simple in construction having very few parts, which renders it less liable to errors due to wear, and very reliable in operation. It stands up well in use and its proportions and shape render it easy to handle.

I am aware that the present invention can be embodied in other specific forms without departing from the spirit or essential attributes thereof, and I therefore desire the present description to be considered in all respects as illustrative and not restrictive, reference being had to the appended claims, rather than to the aforesaid description to indicate the scope of the invention.

What is claimed is:

1. The combination of a container sealed against ambient atmosphere, the walls of said container comprising means for varying the interior volume of said container responsive to variations in temperature; a gaseous medium within said container; and pressure-responsive indicating means connected to and in communication with the interior of said container, whereby it is actuated by antagonistic action thereon of said gaseous medium and atmospheric pressure.

2. The combination of a container sealed against ambient atmosphere, the walls of said container comprising means expansible and contractible responsive to variations in temperature for varying the interior volume of said container; a gaseous medium contained within said container; and pressure-responsive indicating means connected to and in communication with the interior of said container, whereby it is actuated by antagonistic action thereon of pressure of said gaseous medium and atmospheric pressure.

3. The combination of a container sealed against ambient atmosphere, the wall of which comprises a metal helix encased in cooked latex to render the volume of said container variable responsive to variations in temperature; a gaseous medium contained in said container; and pressure-responsive indicating means connected to and in communication with the interior of said container, whereby it is actuated by antagonistic action thereon of pressure of said gaseous medium and atmospheric pressure.

4. The combination of a container sealed against ambient atmosphere, the wall of which comprises a bimetal helix encased in cooked latex to render the volume of said container variable responsive to variations in temperature; a gaseous medium contained within said container; and pressure-responsive indicating means connected to and in communication with the interior of said container, whereby it is actuated by antagonistic action thereon of atmospheric pressure and pressure of said gaseous medium.

5. The combination of a container sealed against ambient atmosphere, the wall of which comprises a bimetal helix encased in resilient material to render the volume of said container variable responsive to variations in temperature; a gaseous medium contained in said container; and pressure-responsive indicating means connected to and in communication with the interior of said container, whereby it is actuated by antagonistic action thereon of atmospheric pressure and pressure of said gaseous medium.

6. The combination of a container sealed against ambient atmosphere, the wall of which comprises a bimetal helix encased in latex to render the volume of said container variable responsive to variations in temperature; a constant pressure exertive gaseous medium within said container; and pressure-responsive indicating means connected to and in communication with the interior of said container, whereby it is actuated by antagonistic action of atmospheric pressure and pressure of said gaseous medium.

7. The combination of a container sealed against ambient atmosphere, the wall of which comprises a bimetal helix encased in rubber latex to render the volume of said container variable responsive to variations in temperature; a constant pressure exertive gaseous medium contained in said container; and a differential pressure gauge connected to and in communication with the interior of said container, whereby it is actuated by antagonistic action of atmospheric pressure and pressure of said gaseous medium.

PERCY L. SPENCER.

REFERENCES CITED

The following references are of record in the file of this patent:

UNITED STATES PATENTS

| Number | Name | Date |
| --- | --- | --- |
| 1,405,841 | Haines | Feb. 7, 1922 |
| 1,676,983 | Eremeef | July 10, 1928 |